United States Patent
Umejima et al.

(10) Patent No.: US 8,612,506 B2
(45) Date of Patent: Dec. 17, 2013

(54) ARITHMETIC CIRCUIT, SIGNAL SELECTION METHOD, AND COMPUTER PROGRAM

(75) Inventors: Masayuki Umejima, Tokyo (JP); Katsuhiro Onozuka, Tokyo (JP); Norihiro Ichimaru, Tokyo (JP); Shogo Kawata, Kanagawa (JP)

(73) Assignee: Felica Networks, Inc., Tokyo (JP)

(*) Notice: Subject to any disclaimer, the term of this patent is extended or adjusted under 35 U.S.C. 154(b) by 911 days.

(21) Appl. No.: 12/723,839

(22) Filed: Mar. 15, 2010

(65) Prior Publication Data
US 2010/0246652 A1    Sep. 30, 2010

(30) Foreign Application Priority Data
Mar. 30, 2009    (JP) ............... P2009-083231

(51) Int. Cl.
*G06F 7/38*    (2006.01)
(52) U.S. Cl.
USPC ..................................... 708/490; 375/224
(58) Field of Classification Search
None
See application file for complete search history.

(56) References Cited

U.S. PATENT DOCUMENTS

| | | | |
|---|---|---|---|
| 6,031,883 A * | 2/2000 | Sanderford et al. | 375/344 |
| 6,388,618 B1 * | 5/2002 | Stilp et al. | 342/457 |
| 2004/0161246 A1 * | 8/2004 | Matsushita et al. | 398/187 |

FOREIGN PATENT DOCUMENTS

| | | |
|---|---|---|
| JP | 2008-35104 | 2/2008 |
| JP | 2008-269368 | 11/2008 |

* cited by examiner

*Primary Examiner* — Michael D Yaary
(74) *Attorney, Agent, or Firm* — K&L Gates LLP (57) ABSTRACT

An arithmetic circuit includes: a detection unit that detects a code error for plural signals respectively modulated by different modulation methods and encoded by a predetermined encoding method; a measurement unit that measures a number of times of signal variations at a predetermined frequency or less generated in the plural signals in a period from detection of the code error in the detection unit to first detection of predetermined data contained in the plural signals with respect to each of the plural signals; and a selection unit that selects one signal from the plural signals based on a measurement result of the measurement unit.

9 Claims, 5 Drawing Sheets

ARITHMETIC CIRCUIT, SIGNAL SELECTION METHOD, AND COMPUTER PROGRAM

CROSS REFERENCES TO RELATED APPLICATIONS

The present application claims priority to Japanese Priority Patent Application JP 2009-083231 filed in the Japan Patent Office on Mar. 30, 2009, the entire contents of which is hereby incorporated by reference.

BACKGROUND

The present application relates to an arithmetic circuit, a signal selection method, and a computer program.

Recently, information processing terminals that can communicate with a noncontact reading and writing device (reader/writer), such as a noncontact IC (Integrated Circuit) card (hereinafter, referred to as "IC card") and a cellular phone having an IC card function have been in widespread use. The reading and writing device and the information processing terminal use a magnetic field (carrier wave) at a specific frequency of 13.56 MHz, for example, for communication and perform transmission and reception of data using the carrier wave. A noncontact communication system using the information processing terminal is widely used for entry and exit processing at automatic ticket gates of stations, boarding gates of airports, etc., and payment processing in registers of sales stores, vending machines, etc.

With the widespread use of the noncontact communication system, there have been plural communication systems between terminals and reader writers. The communication systems between terminals and reader writers are divided into Type A, Type B, Type C, etc. according to the differences in modulation methods and encoding methods. However, the difference between the communication systems is not obvious for users. If it may be impossible to make noncontact communication due to the difference in communication system even when the IC card, the cellular phone, or the like is held over the reader writer, the users find it inconvenient. Accordingly, communication devices and communication methods for supporting plural communication systems have been developed and technologies relating to the communication devices and communication methods have been disclosed (e.g., see JP-A-2008-35104 and JP-2008-269368).

SUMMARY

However, in the technologies in the past, at signal selection, it is necessary to provide plural demodulators for one input signal route or provide plural antennas having different characteristics of impedance or the like. By providing plural demodulators or antennas, there have been problems that increase in circuit size, increase in packaging area, and increase in technical difficulty are caused and become obstacles to downsizing of the device.

Further, a communicable detection route can be selected using a method of comparing analog amplitudes of plural demodulators after detection and selecting the detection route having the maximum amplitude. However, in the method, there have been problems that the amplitudes of all detection routes decrease at long distances, selection becomes difficult under a low S/N-ratio condition, and very accurate comparators are necessary.

It is desirable to provide new and improved arithmetic circuit, signal selection method, and computer program that can select a communicable detection route with no complicated configuration and can correctly select the communicable detection route even at long distances under a low S/N-ratio condition.

An arithmetic circuit according to an embodiment includes: a detection unit that detects a code error for plural signals respectively modulated by different modulation methods and encoded by a predetermined encoding method; a measurement unit that measures a number of times of signal variations at a predetermined frequency or less generated in the plural signals in a period from detection of the code error in the detection unit and first detection of predetermined data contained in the plural signals with respect to each of the plural signals; and a selection unit that selects one signal from the plural signals based on a measurement result of the measurement unit.

According to the configuration, the detection unit detects a code error for plural signals respectively modulated by different modulation methods and encoded by a predetermined encoding method, and the measurement unit measures a number of times of signal variations at a predetermined frequency or less generated in the plural signals in a period from detection of the code error in the detection unit to first detection of the predetermined data contained in the plural signals with respect to each of the plural signals. Further, the selection unit selects one signal from the plural signals based on a measurement result of the measurement unit. As a result, the arithmetic circuit determines signal quality in the period from the detection of the code error to the first detection of the predetermined data contained in the plural signals and selects the signal based on the determination result. Thereby, a communicable detection route can be selected with no complicated configuration and the communicable detection route can correctly be selected even at long distances under a low S/N-ratio condition.

The arithmetic circuit may further include an amplitude measurement unit that measures voltage amplitudes of the plural signals, and the selection unit may select one signal from the plural signals based on a measurement result of the amplitude measurement unit and a measurement result of the measurement unit.

The selection unit may select one signal from the plural signals based on the measurement result of the measurement unit if it may be impossible to select one signal from the plural signals based on the measurement result of the amplitude measurement unit.

The selection unit may select one signal from the plural signals based on the measurement result of the amplitude measurement unit if it may be impossible to select one signal from the plural signals based on the measurement result of the measurement unit.

The measurement unit may reset the measurement result if, after the code error is detected in the detection unit, a code error is further detected in the detection unit.

The selection unit may select a signal having the number of times of signal variations at a predetermined frequency or less measured by the measurement unit less than a predetermined threshold value.

The selection unit may include a waiting unit that allows waiting from the detection of the predetermined data to the selection of one signal from the plural signals.

Further, a signal selection method according to an embodiment includes the steps of: a detection step of detecting a code error for plural signals respectively modulated by different modulation methods and encoded by a predetermined encoding method; a measurement step of measuring a number of times of signal variations at a predetermined frequency or less generated in the plural signals in a period from detection of the code error in the detection step and first detection of predetermined data contained in the plural signals with respect to each of the plural signals; and a selection step of selecting one signal from the plural signals based on a measurement result of the measurement step.

Furthermore, a computer program according to an embodiment allows a computer to execute the steps of: a detection step of detecting a code error for plural signals respectively modulated by different modulation methods and encoded by a predetermined encoding method; a measurement step of measuring a number of times of signal variations at a predetermined frequency or less generated in the plural signals in a period from detection of the code error in the detection step and first detection of predetermined data contained in the plural signals with respect to each of the plural signals; and a selection step of selecting one signal from the plural signals based on a measurement result of the measurement step.

As described above, according to an embodiment, new and improved arithmetic circuit, signal selection method, and computer program that can select a communicable detection route with no complicated configuration and can correctly select the communicable detection route even at long distances under a low S/N-ratio condition can be provided.

Additional features and advantages are described herein, and will be apparent from the following Detailed Description and the figures.

DETAILED DESCRIPTION

The present application will be described in detail with reference to the accompanying drawings, according to an embodiment. In the specification and drawings, the same signs are assigned to component elements having substantially the same functions and configurations and the duplicated explanation will be omitted.

Further, the present application in an embodiment will be described in detail according to the following order.
<1. One Embodiment>
[1-1. Configuration of arithmetic circuit]
[1-2. Configuration of analog amplitude threshold value comparison circuit]
[1-3. Signal selection processing]
[1-4. Noncontact communication system]
<2. Summary>
<1. One Embodiment>
[1-1. Configuration of Arithmetic Circuit]

Figure 1:
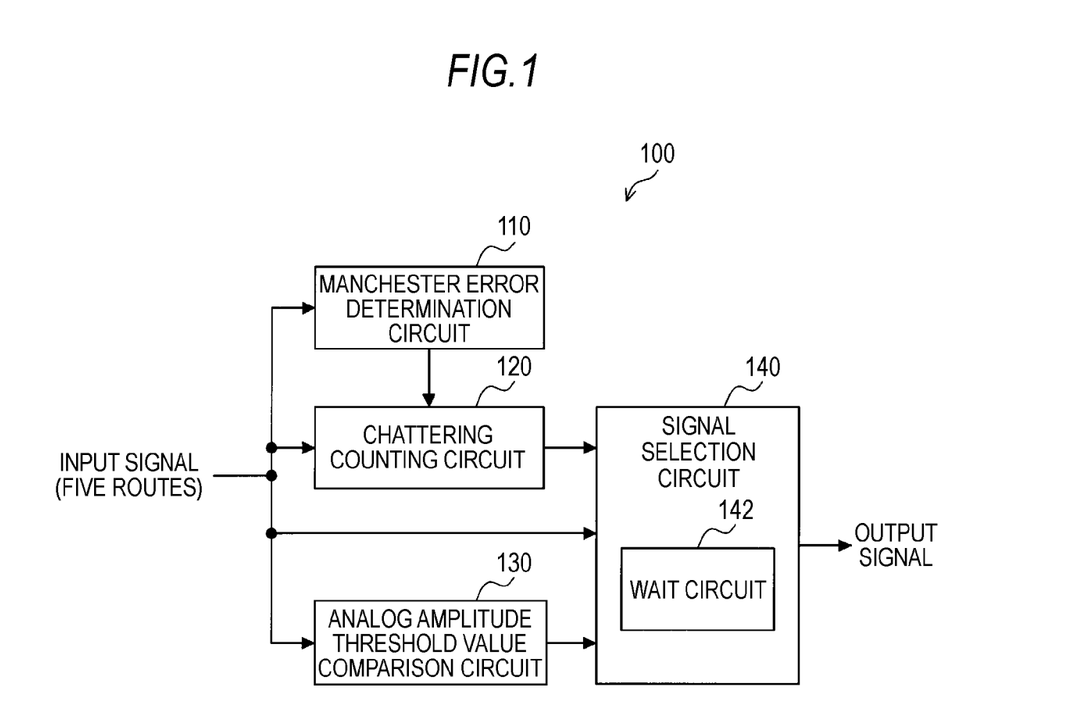
FIG. 1 is an explanatory diagram showing a configuration of an arithmetic circuit 100 according to an embodiment.

First, a configuration of an arithmetic circuit according to one embodiment will be explained. FIG. 1 is an explanatory diagram showing a configuration of an arithmetic circuit 100 according to one embodiment. As below, the configuration of the arithmetic circuit 100 according to one embodiment using FIG. 1.

The arithmetic circuit 100 according to one embodiment shown in FIG. 1 is a circuit to which signals modulated by plural modulation methods at the other end of communication can be input at the near-field noncontact communication. Further, the arithmetic circuit 100 according to one embodiment is a circuit that, when the signals modulated by plural modulation methods are input, selects a signal having the best signal quality from the plural signals. The arithmetic circuit 100 according to one embodiment is a circuit to which signals modulated by five modulation methods can input. Further, the arithmetic circuit 100 selects a signal having the best signal quality from the input signals modulated by the five modulation methods. In the embodiment, the five modulation methods are ASK (Amplitude Shift keying), S/H (Sample/Hold) at 0 degrees, S/H at 90 degrees, CLK (Clock) at 0 degrees, and CLK at 90 degrees. It is obvious that the signal modulation methods are not limited to those examples and the number of routes of reception signals is not limited to that in the examples in the embodiment. As shown in FIG. 1, the arithmetic circuit 100 according to one embodiment includes a Manchester error determination circuit 110, a chattering counting circuit 120, an analog amplitude threshold value comparison circuit 130, and a signal selection circuit 140.

The Manchester error determination circuit 110 is a circuit that determines whether the signal input to the arithmetic circuit 100 has a normal Manchester code or not. The Manchester code is basically a clock signal having a duty ratio of 50% encoded as data "0" when the first half is at Hi level and the second half is at Low level and as data "1" when the first half is at Low level and the second half is at Hi level. The Manchester error determination circuit 110 transfers a Manchester error determination signal representing whether a code error occurs or not in the data encoded by the Manchester encoding method to the chattering counting circuit 120. Hereinafter, the code error of the data encoded by the Manchester encoding method is also referred to as "Manchester error".

The chattering counting circuit 120 is a circuit that measures, only with respect to the signal having a normal Manchester code of the signals input to the arithmetic circuit 100 according to the determination result in the Manchester error determination circuit 110, a number of times of chattering of the signal. Note that the chattering counting circuit 120 may determine whether there is chattering or not depending on whether there is a variation of the signal with a predetermined period or less or not. The chattering counting circuit 120 counts the number of times of chattering generated in each signal in a period from the occurrence of the Manchester error to the first detection of the sync code contained in the input signal. The occurrence of the Manchester error is detected by the Manchester error determination circuit 110.

Figure 2:
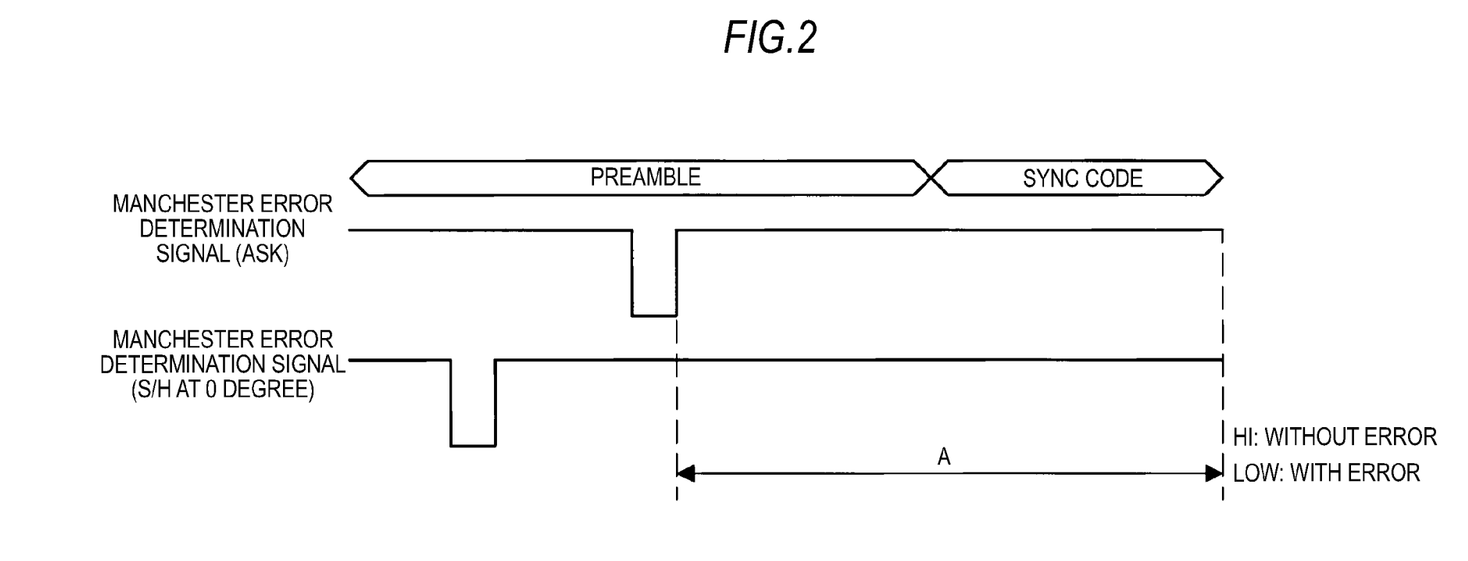
FIG. 2 is an explanatory diagram showing a measurement period when chattering is measured.

FIG. 2 is an explanatory diagram showing a relationship between Manchester error determination signals generated by the Manchester error determination circuit 110 and the measurement period when chattering is measured by the chattering counting circuit 120. In FIG. 2, for convenience of explanation, only the Manchester error determination signals for the signals by the two modulation methods of ASK and S/H at 0 degrees are shown.

FIG. 2 shows preambles and sync codes as data input to the arithmetic circuit 100. The preamble is a header part of reception data and contains data at least of 48 bits of logical 0. The sync code is data subsequent to the preamble and is a code having a data length of 2 bytes for synchronization with the reference clock signal.

As shown in FIG. 2, the Manchester error determination signal maintains Hi level if no Manchester error occurs in the signal input to the arithmetic circuit 100. On the other hand, if a Manchester error occurs in the signal input to the arithmetic circuit 100, the determination signal changes to Low level. When a Manchester error occurs in the preamble period of the signal input to the arithmetic circuit 100, the Manchester error determination signal becomes Low level. Then, when the Manchester error determination signal becomes Low level, the chattering counting circuit 120 starts measurement of the number of times of chattering.

The measurement period of the number of times of chattering in the chattering counting circuit 120 is from the occurrence of the Manchester error to the detection of the sync code as described above. Here, if a Manchester error occurs in any one of the input signals, the chattering counting circuit 120 resets the measurement results for all of the input signals. In FIG. 2, a Manchester error first occurs in the signal modulated by S/H at 0 degrees, and the Manchester error determination signal for the signal modulated by S/H at 0 degrees is temporarily at Low level. Then, when the chattering counting circuit 120 detects that the Manchester error determination signal has become Hi level, the measurement of the number of times of chattering in the chattering counting circuit 120 is started.

However, if a Manchester error occurs in another signal after the measurement of the number of times of chattering in the chattering counting circuit 120 is started, the measurement result for the signal of S/H at 0 degrees is reset. In the example shown in FIG. 2, the case where a Manchester error occurs in the ASK modulated signal is shown. If a Manchester error occurs in the ASK modulated signal after the measurement of the number of times of chattering is started, the Manchester error determination signal for the ASK modulated signal is temporarily at Low level. When the Manchester error determination signal is at Low level, the measurement value held in the chattering counting circuit 120 is reset. Then, when the chattering counting circuit 120 detects that the Manchester error determination signal has become Hi level, the measurement of the number of times of chattering in the chattering counting circuit 120 is started again. Therefore, the measurement period of chattering in the chattering counting circuit 120 is the period shown by A in FIG. 2.

The measurement result of chattering is compared with a preset threshold value at detection of the sync code. Then, as a result of comparison between the measurement value and the threshold value, if the measurement value is less than the threshold value, the chattering counting circuit 120 determines the input signal as a normal signal and sends the determination result to the signal selection circuit 140.

In this manner, the measurement value held in the chattering counting circuit 120 is reset due to the occurrence of the Manchester error, and thereby, the number of times of chattering in the period from the latest occurrence of the Manchester error to the detection of the sync code can be measured. Then, by the measurement of the number of times of chattering in the period, the measurement result can be used for the judgment of the quality of the reception signal. The measurement result in the chattering counting circuit 120 is sent to the signal selection circuit 140.

The chattering counting circuit 120 may include a DPLL (Digital Phase-Locked Loop) for measurement of the number of times of chattering. When the measurement value held in the chattering counting circuit 120 is reset due to the occurrence of the Manchester error, the chattering counting circuit 120 may reset the measurement value by clearing the buffer of the DPLL.

The analog amplitude threshold value comparison circuit 130 compares the amplitude of the signal input to the arithmetic circuit 100 with the preset threshold value. The analog amplitude threshold value comparison circuit 130 performs detection of the signal input to the arithmetic circuit 100 and the signal after detection is turned to a DC (Direct current). Then, the analog amplitude threshold value comparison circuit 130 compares the voltage value after turned to the DC with the preset threshold value, and outputs a comparison result to the signal selection circuit 140.

Note that the analog amplitude threshold value comparison circuit 130 may be provided for the respective input signal routes. In the embodiment, since the signals of the five routes are input to the arithmetic circuit 100, five analog amplitude threshold value comparison circuit 130 may be provided for the respective input signals.

The signal selection circuit 140 selects and outputs one signal having the best reception quality from the input signals of the plural routes input to the arithmetic circuit 100. To the signal selection circuit 140, the measurement result of the chattering counting circuit 120 and the comparison result of the analog amplitude threshold value comparison circuit 130 are sent in addition to the input signals of the plural routes input to the arithmetic circuit 100. The signal selection circuit 140 selects one signal having the best reception quality using the measurement result of the chattering counting circuit 120 and the comparison result of the analog amplitude threshold value comparison circuit 130.

The signal selection circuit 140 includes a wait circuit 142. The wait circuit 142 is a circuit for allowing the processing in the signal selection circuit 140 to wait in a predetermined time from the time when the sync code is first detected in the input signals of five routes. In the embodiment, the wait circuit 142 allows the processing in the signal selection circuit 140 to wait for 3 microseconds. In the embodiment, it is obvious that the waiting time is not limited to the example.

The signal selection circuit 140 starts signal selection processing of selecting one signal having the best reception quality after the timing of 3 microseconds by the wait circuit 142 after the sync code is first detected in the input signals of five routes. The details of the signal selection processing in the signal selection circuit 140 will be specifically described later.

The configuration of the arithmetic circuit 100 according to one embodiment has been explained. Next, a configuration of the analog amplitude threshold value comparison circuit 130 according to one embodiment will be explained.

[1-2. Configuration of Analog Amplitude Threshold Value Comparison Circuit]

Figure 3:
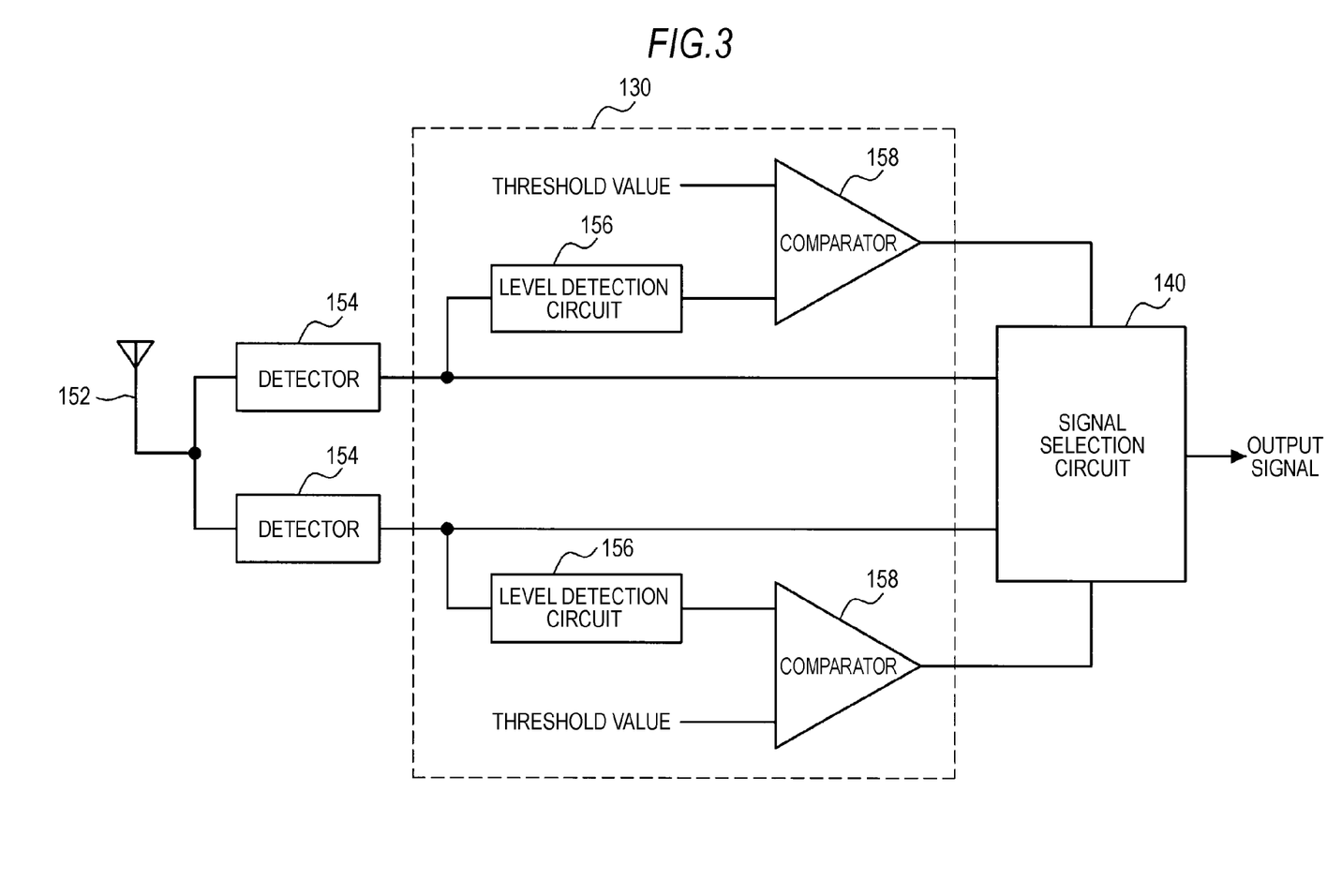
FIG. 3 is an explanatory diagram showing a configuration of an analog amplitude threshold value comparison circuit 130 according to an embodiment.

FIG. 3 is an explanatory diagram showing a configuration of an analog amplitude threshold value comparison circuit 130 according to one embodiment. As below, the configuration of the analog amplitude threshold value comparison circuit 130 according to one embodiment will be explained using FIG. 3.

As shown in FIG. 3, the analog amplitude threshold value comparison circuit 130 according to one embodiment includes level detection circuits 156 and comparators 158. Further, FIG. 3 also shows an antenna coil 152 and detectors 154.

The antenna coil 152 receives data from another device that performs noncontact communication. In the antenna coil 152, a current flows according to the change of the magnetic field generated by the other device when noncontact communication is executed. The current flowing in the antenna coil 152 is used as a reception signal and the reception signal is demodulated, and thereby, noncontact communication is performed with the other device.

The detector 154 performs detection of the signal received by the antenna coil 152 and input to the arithmetic circuit 100. The detection by the detector 154 is performed with respect to each route of the input signal. In FIG. 3, only two detectors 154 are shown, however, the number of detectors 154 is determined according to the number of routes of input signals. The signal after detection by the detector 154 is directly sent to the signal selection circuit 140 and also sent to the level detection circuit 156.

The level detection circuit 156 is a circuit that detects the level (DC voltage value) of the signal detected by the detector 154. The detection result of the voltage value in the level detection circuit 156 is sent to the comparator 158.

The comparator 158 compares the voltage value detected by the level detection circuit 156 with a preset threshold value. The comparison result between the voltage value detected by the level detection circuit 156 and the preset threshold value in the comparator 158 is sent to the signal selection circuit 140. The signal selection circuit 140 executes the signal selection processing using comparison results for the respective signal routes sent from the comparators 158.

The analog amplitude threshold value comparison circuit 130 according to one embodiment has been explained. Next, the signal selection processing using the arithmetic circuit 100 according to one embodiment will be explained.

[1-3. Signal Selection Processing]

Figure 4:
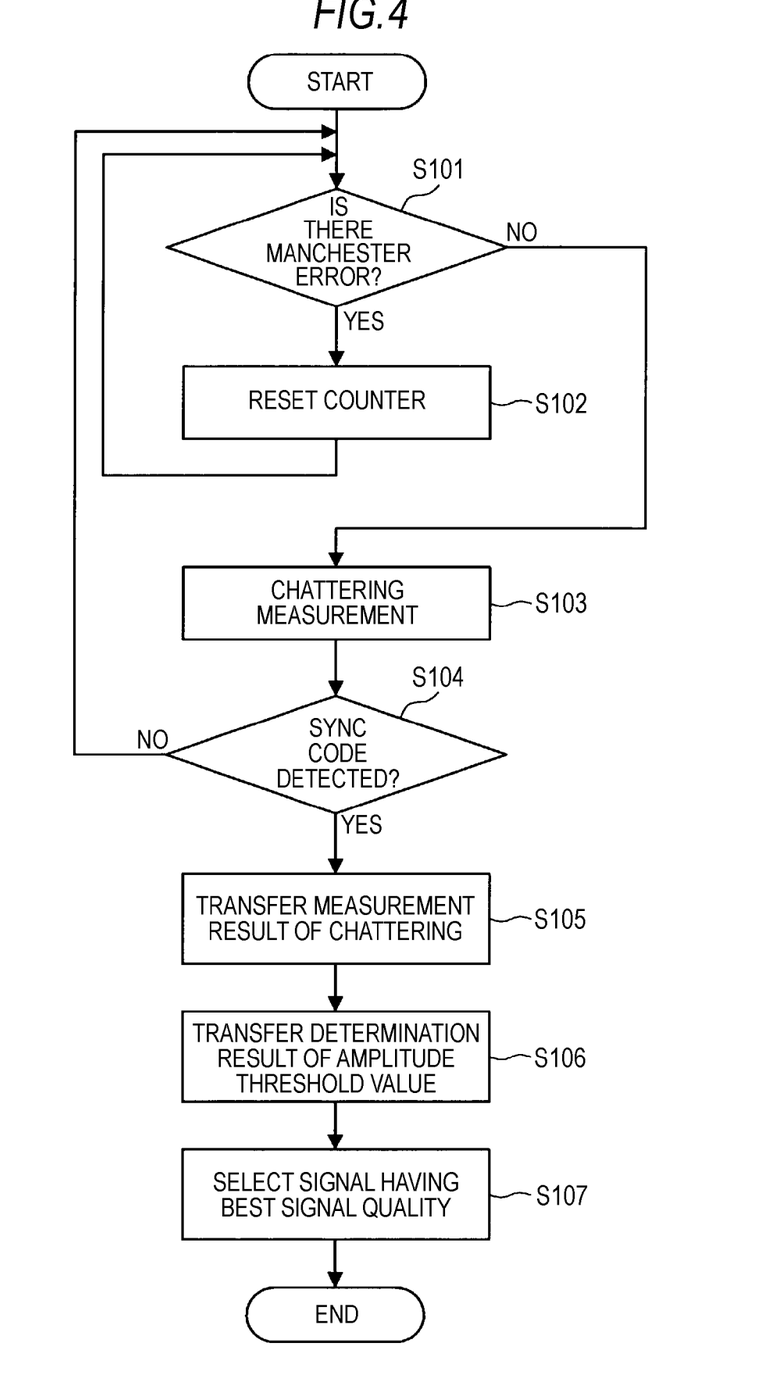
FIG. 4 is a flowchart showing signal selection processing using the arithmetic circuit 100 according to an embodiment.

FIG. 4 is a flowchart showing the signal selection processing using the arithmetic circuit 100 according to one embodiment. As below, the signal selection processing using the arithmetic circuit 100 according to one embodiment will be explained using FIG. 4.

When near-field noncontact communication is started, plural reception signals are input to the arithmetic circuit 100. When the plural reception signals are input to the arithmetic circuit 100, first, in the Manchester error determination circuit 110, whether the reception signal has a normal Manchester code or not is determined with respect to each reception signal (step S101).

At the step S101, if the determination that a Manchester error has occurred in the reception signal is made by the Manchester error determination circuit 110, the Manchester error determination circuit 110 provides a notification that the Manchester error has occurred to the chattering counting circuit 120. The chattering counting circuit 120 that has received the notification that the Manchester error had occurred from the Manchester error determination circuit 110 resets the value of the counter held within (step S102).

From the Manchester error determination circuit 110, the Manchester error determination signal with respect to each input signal route as shown in FIG. 2 is sent to the chattering counting circuit 120. As described above, if no Manchester error has occurred, the Manchester error determination signal is at Hi state. On the other hand, when a Manchester error occurs, the Manchester error determination signal changes to Low state. The chattering counting circuit 120 can recognize the occurrence of the Manchester error by sensing the change of the Manchester error determination signal to Low state.

As described above, the chattering counting circuit 120 may include a DPLL (Digital Phase-Locked Loop) for measurement of chattering. Further, when the measurement value held by the chattering counting circuit 120 is reset at the step S102, the chattering counting circuit 120 may reset the measurement value by clearing the buffer of the DPLL.

On the other hand, at the step S101, if the determination that no Manchester error has occurred in the reception signal is made by the Manchester error determination circuit 110, the Manchester error determination circuit 110 provides a notification that the reception signal is a signal having a normal Manchester code to the chattering counting circuit 120. The chattering counting circuit 120 that has received the notification measures chattering (step S103).

From the Manchester error determination circuit 110, the Manchester error determination signal with respect to each input signal route as shown in FIG. 2 is sent to the chattering counting circuit 120. If no Manchester error has occurred, the Manchester error determination signal is at Hi state, and the chattering counting circuit 120 continues the measurement of chattering in a period in which the Manchester error determination signal is at Hi state.

After the measurement of chattering is performed in the chattering counting circuit 120, subsequently, whether the chattering counting circuit 120 has detected the sync code contained in the reception signal or not is determined (step S104).

As a result of the determination at the step S104, if the chattering counting circuit 120 has not detected the sync code contained in the reception signal, the process returns to the step S101 and whether the reception signal has a signal having a normal Manchester code or not is determined. On the other hand, at the step S104, if the determination that the chattering counting circuit 120 has detected the sync code contained in the reception signal is made, the chattering counting circuit 120 sends the measurement result of chattering in the period from the last occurrence of the Manchester error to the detection of the sync code to the signal selection circuit 140 (step S105).

Further, in parallel to the measurement of chattering in the chattering counting circuit 120, the comparison result between the amplitudes of the reception signals and the threshold value in the analog amplitude threshold value comparison circuit 130 is sent from the analog amplitude threshold value comparison circuit 130 to the signal selection circuit 140 (step S106).

When the measurement result of chattering in the chattering counting circuit 120 and the comparison result in the analog amplitude threshold value comparison circuit 130 are input, the signal selection circuit 140 selects one signal having the best reception quality from the input signals using the information (step S107). The selection processing in the signal selection circuit 140 at the step S107 is performed after 3 microseconds from the first detection of the sync code in the five input signals. Then, the selection processing in the signal selection circuit 140 is executed after the waiting for 3 microseconds by the wait circuit 142.

Here, an example of a selection criterion of the signal in the signal selection circuit 140 will be explained. In the embodiment, the quality of the input signals is determined in the order of the comparison result by the analog amplitude threshold value comparison circuit 130 (analog threshold value selection method) and the measurement result of chattering in the chattering counting circuit 120 (chattering counting method). Then, if it may be impossible to select the signal having the best reception quality even when the quality of the input signals is determined in the order of the analog threshold value selection method and the chattering counting method, the signal selection circuit 140 sets the order of priority in the order of ASK, S/H at 0 degrees, S/H at 90 degrees, CLK at 0 degrees, and CLK at 90 degrees in advance, and selects one signal according to the order of priority.

When the arithmetic circuit 100 selects one signal from the input signals by the analog threshold value selection method, detection of the input signal is performed by the detector 154 and whether the voltage value of the signal after detection is equal to or more than the preset threshold value or not is determined by the comparator 158. The determination result of the comparator 158 is sent to the signal selection circuit 140, and the signal selection circuit 140 selects the signal having the voltage value after detection equal to or more than the predetermined threshold value as the signal having the best reception quality.

Then, as a result of the determination in the comparator 158, if plural detection routes equal to or more than the threshold value exist, the signal selection circuit 140 selects one signal based on the quality of the logic waveform with respect to the plural detection routes. Further, as a result of the determination in the comparator 158, if no detection route equal to or more than the threshold value exists, the circuit selects one signal based on the quality of the logic waveform from all detection routes.

Figure 5:
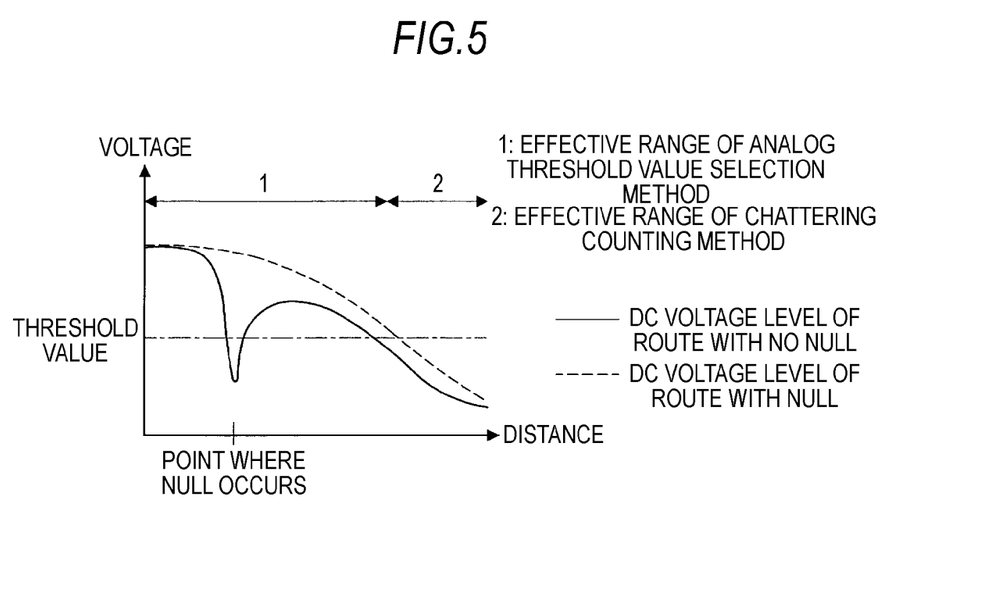
FIG. 5 is an explanatory diagram showing an example of a relationship between voltages of input signals and communication distances at noncontact communication.

FIG. 5 is an explanatory diagram showing an example of a relationship between voltages of input signals and communication distances at noncontact communication. In FIG. 5, the waveform indicated by the solid line shows a DC voltage level of the route in which NULL occurs at noncontact communication, and the waveform indicated by the broken line shows a DC voltage level of the route in which no NULL occurs at noncontact communication. For example, in the case of the ASK modulation method, the NULL occurs when communication is executed by the data amplitude of the synthesized wave of the transmission and reception waveforms, but phases differ between the transmission and reception waveforms and the data amplitude is cancelled.

Further, FIG. 5 also shows an example of the threshold value used when one signal is selected from the input signals by the analog threshold value selection method. It is desirable that DC voltage value when NULL occurs is detected in advance with respect to one route in which NULL occurs and the threshold value used at the analog threshold value selection method is set to a value larger than the detected DC detection value. By setting the threshold value in this manner, the route under the condition having the possibility that NULL occurs is high can be removed from options at signal selection.

As shown in FIG. 5, as the communication distance becomes longer, the DC voltage level of the input signal becomes lower. Therefore, signal selection by the analog threshold value selection method is effective in the range indicated by the section 1 in FIG. 5, and signal selection by the chattering counting method is effective in the range indicated by the section 2.

On the other hand, when the arithmetic circuit 100 selects one signal from the input signals by the chattering counting method, in the chattering counting circuit 120, whether the number of times of occurrence of chattering in the measurement period A shown in FIG. 2 is less than a predetermined threshold value or not is determined with respect to each input signal. If the number of times of occurrence of chattering is less than the predetermined threshold value, the chattering counting circuit 120 determines the signal as a normal signal. On the other hand, if the number of times of occurrence of chattering is not less than the predetermined threshold value, the chattering counting circuit 120 determines the signal as an abnormal signal. The determination result in the chattering counting circuit 120 is sent to the signal selection circuit 140.

Then, the signal selection circuit 140 selects the signal determined as the normal signal by the chattering counting circuit 120.

Then, if it may be impossible to select the signal having the best reception quality even when the quality of the input signals is determined in the order of the analog threshold value selection method and the chattering counting method, as described above, the signal selection circuit 140 sets the order of priority in advance. The order of priority may be the order of ASK, S/H at 0 degrees, S/H at 90 degrees, CLK at 0 degrees, and CLK at 90 degrees. Then, the signal selection circuit 140 selects one signal according to the preset order of priority.

Note that the signal selection circuit 140 determines the quality of the input signals in the order of the analog threshold value selection method and the chattering counting method, however, the embodiment is not limited to the example. The signal selection circuit 140 may determine the quality of the input signals in the opposite order, i.e., in the order of the chattering counting method and the analog threshold value selection method.

The signal selection processing using the arithmetic circuit 100 according to one embodiment has been explained using FIG. 4. Next, a noncontact communication system using the arithmetic circuit 100 according to one embodiment will be explained.

[1-4. Noncontact Communication System]

Figure 6:
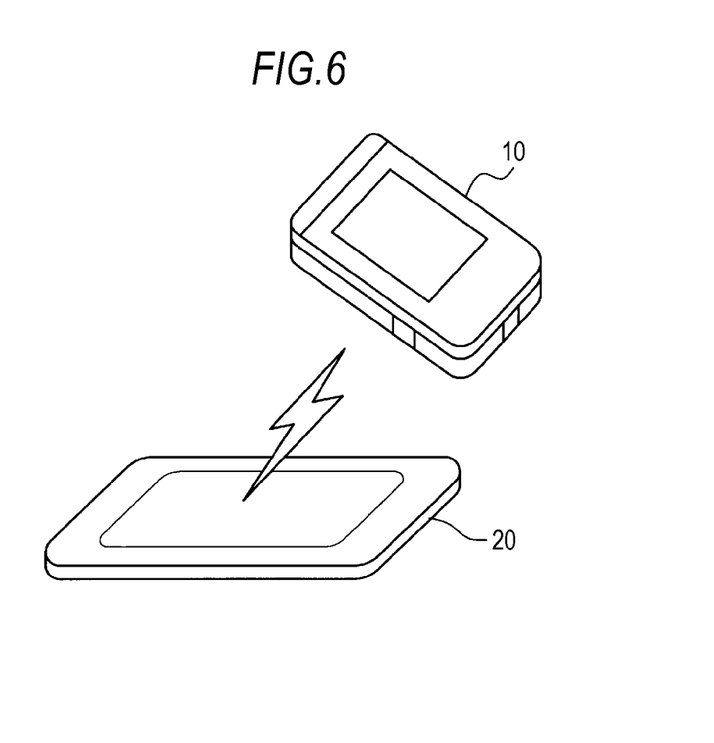
FIG. 6 is an explanatory diagram showing an example of a noncontact communication system using the arithmetic circuit 100 according to an embodiment.

FIG. 6 is an explanatory diagram showing an example of the noncontact communication system using the arithmetic circuit 100 according to one embodiment. As shown in FIG. 6, the noncontact communication system includes a cellular phone 10 and a reader writer 20, for example. The communication in the noncontact communication system shown in FIG. 6 may be "symmetric communication" using no subcarrier performed at a communication velocity of 212 kbps using a frequency band of 13.56 MHz, for example. Further, the noncontact communication system according to one embodiment realizes wireless communication by modulating carrier wave, for example. Further, as the modulation methods used in the noncontact communication system shown in FIG. 6, for example, there are ASK, S/H at 0 degrees, S/H at 90 degrees, CLK at 0 degrees, CLK at 90 degrees, etc., and the encoding method used in the noncontact communication system shown in FIG. 6 is the Manchester encoding method.

The cellular phone 10 includes an IC chip containing an antenna coil inside for noncontact transmission and reception of data between the reader writer 20 and itself by the electromagnetic induction method. The reader writer 20 also includes an antenna coil. Electromagnetic wave is emitted from the antenna coil of the reader writer 20, and, when the cellular phone 10 is held over the reader writer 20, the electromagnetic wave passes through the inside of the antenna coil and an electromotive force is generated in the antenna coil.

When the electromotive force is generated in the antenna coil contained in the IC chip of the cellular phone 10, a current flows in the antenna coil. A magnetic field is generated when the current flows in the antenna coil and the IC chip starts operation when the current flows in the IC chip. The IC chip of the cellular phone 10 changes the impedance of the cellular phone 10 for transmission of data to the reader writer 20 using a predetermined modulation method. When the impedance of the cellular phone 10 changes, the magnetic field generated from the antenna coil contained in the IC chip at the cellular phone 10 side changes.

Regarding the reader writer 20, the voltage value of the antenna coil at the reader writer 20 side changes due to the change of the magnetic field generated from the antenna coil contained in the IC chip at the cellular phone 10 side. By receiving the change of the voltage value as the modulated signal and performing detection of the modulated signal, the data transmitted from the cellular phone 10 can be received.

Then, the arithmetic circuit 100 shown in FIG. 1 is provided inside of the cellular phone 10, for example. By providing the arithmetic circuit 100 according to one embodiment shown in FIG. 1 inside of the cellular phone 10, the cellular phone 10 can one signal having the best signal quality from the signals input in plural routes. The cellular phone 10 may continue noncontact communication by the modulation method used for the selected signal between the reader writer 20 and itself.

The noncontact communication system used in the arithmetic circuit 100 according to one embodiment has been explained. In FIG. 6, the noncontact communication system in which the noncontact communication is performed between the cellular phone 10 and the reader writer 20 is shown, however, the embodiment is not limited to the example. For example, in the case where the noncontact communication is made with the reader writer 20 using the IC card containing an IC chip inside in place of the cellular phone 10, the arithmetic circuit 100 according to one embodiment may be provided inside of the IC card.

<2. Summary>

As explained above, according to one embodiment, the arithmetic circuit 100 can select one signal having the best reception quality from the signals input in plural routes using a combination of the analog threshold value selection method and the chattering counting method.

Further, when selecting one signal having the best reception quality by the chattering counting method, the arithmetic circuit 100 according to one embodiment measures chattering in the period from the last occurrence of the Manchester error and the detection of the sync code. When the signal is selected, a selection method using the order of detection of sync code may be used, however, the method may erroneously select the signal with which a communication error occurs. On the other hand, the chattering counting method according to one embodiment can use the same measurement period for all input signals, and, as a result of comparison between the measurement value and the threshold value, if the measurement value is less than the threshold value, determines the signal as a normal signal. As a result, the erroneous selection of the signal by the arithmetic circuit 100 according to one embodiment is eliminated, and, if the communication distance becomes longer, stable noncontact communication can be executed because the erroneous selection is eliminated.

Further, the arithmetic circuit 100 according to one embodiment selects one signal having the best reception quality using the combination of the analog threshold value selection method and the chattering counting method. By selecting the signal using the combination of the analog threshold value selection method and the chattering counting method, the arithmetic circuit 100 according to one embodiment can prevent the communication error due to the NULL point by the analog threshold value selection method at the short distance and can select the communicable route by the chattering counting method at the long distance. By the selection of the signal using the arithmetic circuit 100 in this manner, the maximum communication distance between devices at noncontact communication can be extended.

Further, using the combination of the analog threshold value selection method and the chattering counting method, the arithmetic circuit 100 according to one embodiment can select the signal by the chattering counting method even when the voltage value is low and it may be impossible to select the signal by the analog threshold value selection method. When selecting the signal by the chattering counting method, the arithmetic circuit 100 is not necessary to receive the signal again, and can complete signal selection processing at one reception.

Note that the above described arithmetic circuit 100 according to one embodiment has executed the signal selection processing according to one embodiment using hardware, however, the embodiment is not limited to the example, but the signal selection processing may be executed using software. Using FIG. 6 as an example, the signal selection processing may be executed using software by storing a recording medium of a flash memory or the like storing computer programs in the reader writer 20, and reading out the computer programs stored in the reader writer and sequentially executing the programs using a control device of a CPU (Central Processing Unit) or the like.

The preferred embodiments have been explained in detail with reference to the accompanying drawings, however, the embodiments are not limited to the examples. It is obvious that a person having average knowledge in the field may achieve various modified examples or altered examples within a range of the technical idea described in the claims and it is understood that these are naturally within the technical range.

For example, in the above described embodiments, the code error of the data encoded by the Manchester encoding method has been detected, however, the embodiments are not limited to the examples. For example, code error of the data encoded by another encoding method than the Manchester encoding method may be detected.

The embodiments may be applied to an arithmetic circuit, a signal selection method, and a computer program, and specifically, to an arithmetic circuit, a signal selection method, and a computer program that select a signal from plural reception routes.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An arithmetic circuit for an information processing terminal, comprising:
    a detection circuit that detects a code error for plural signals respectively modulated by different modulation methods and encoded by a predetermined encoding method;
    a measurement circuit that measures the number of times of signal variations at a predetermined frequency or less generated in the plural signals in a period from detection of the code error in the detection circuit to first detection of predetermined data contained in the plural signals with respect to each of the plural signals; and
    a selection circuit that selects one signal from the plural signals based on a measurement result of the measurement circuit.

2. The arithmetic circuit according to claim 1, wherein the selection circuit selects a signal having the number of times of signal variations at a predetermined frequency or less measured by the measurement circuit less than a predetermined threshold value.

3. The arithmetic circuit according to claim 1, further comprising an amplitude measurement circuit that measures a voltage amplitudes of the plural signals,
   wherein the selection circuit selects one signal from the plural signals based on a measurement result of the amplitude measurement circuit and a measurement result of the measurement circuit.

4. The arithmetic circuit according to claim 3, wherein the selection circuit selects one signal from the plural signals based on the measurement result of the measurement circuit if it may be impossible to select one signal from the plural signals based on the measurement result of the amplitude measurement circuit.

5. The arithmetic circuit according to claim 3, wherein the selection circuit selects one signal from the plural signals based on the measurement result of the amplitude measurement circuit if it may be impossible to select one signal from the plural signals based on the measurement result of the measurement circuit.

6. The arithmetic circuit according to claim 1, wherein the measurement circuit resets the measurement result if, after the code error is detected in the detection circuit, a code error is further detected in the detection circuit.

7. The arithmetic circuit according to claim 1, wherein the selection circuit includes a waiting circuit that allows waiting from the detection of the predetermined data to the selection of one signal from the plural signals.

8. A signal selection method for an information processing terminal, comprising the steps of:
   a detection step, performed by the information processing terminal, of detecting a code error for plural signals respectively modulated by different modulation methods and encoded by a predetermined encoding method;
   a measurement step, performed by the information processing terminal, of measuring the number of times of signal variations at a predetermined frequency or less generated in the plural signals in a period from detection of the code error in the detection step and first detection of predetermined data contained in the plural signals with respect to each of the plural signals; and
   a selection step, performed by the information processing terminal, of selecting one signal from the plural signals based on a measurement result of the measurement step.

9. A non-transitory computer readable storage medium storing a computer program, which when executed by a computer, causes the computer to execute the steps of:
   a detection step of detecting a code error for plural signals respectively modulated by different modulation methods and encoded by a predetermined encoding method;
   a measurement step of measuring the number of times of signal variations at a predetermined frequency or less generated in the plural signals in a period from detection of the code error in the detection step and first detection of predetermined data contained in the plural signals with respect to each of the plural signals; and
   a selection step of selecting one signal from the plural signals based on a measurement result of the measurement step.

\* \* \* \* \*